INVENTORS
OTTO E. HERMANNS
RALPH F. COOPER
HARMON G. SHIVELY
BY Joseph Januszkiewicz
ATTY.

INVENTORS
OTTO E. HERMANNS
RALPH F. COOPER
HARMON G. SHIVELY
BY Joseph Januszkiewicz
ATTY.

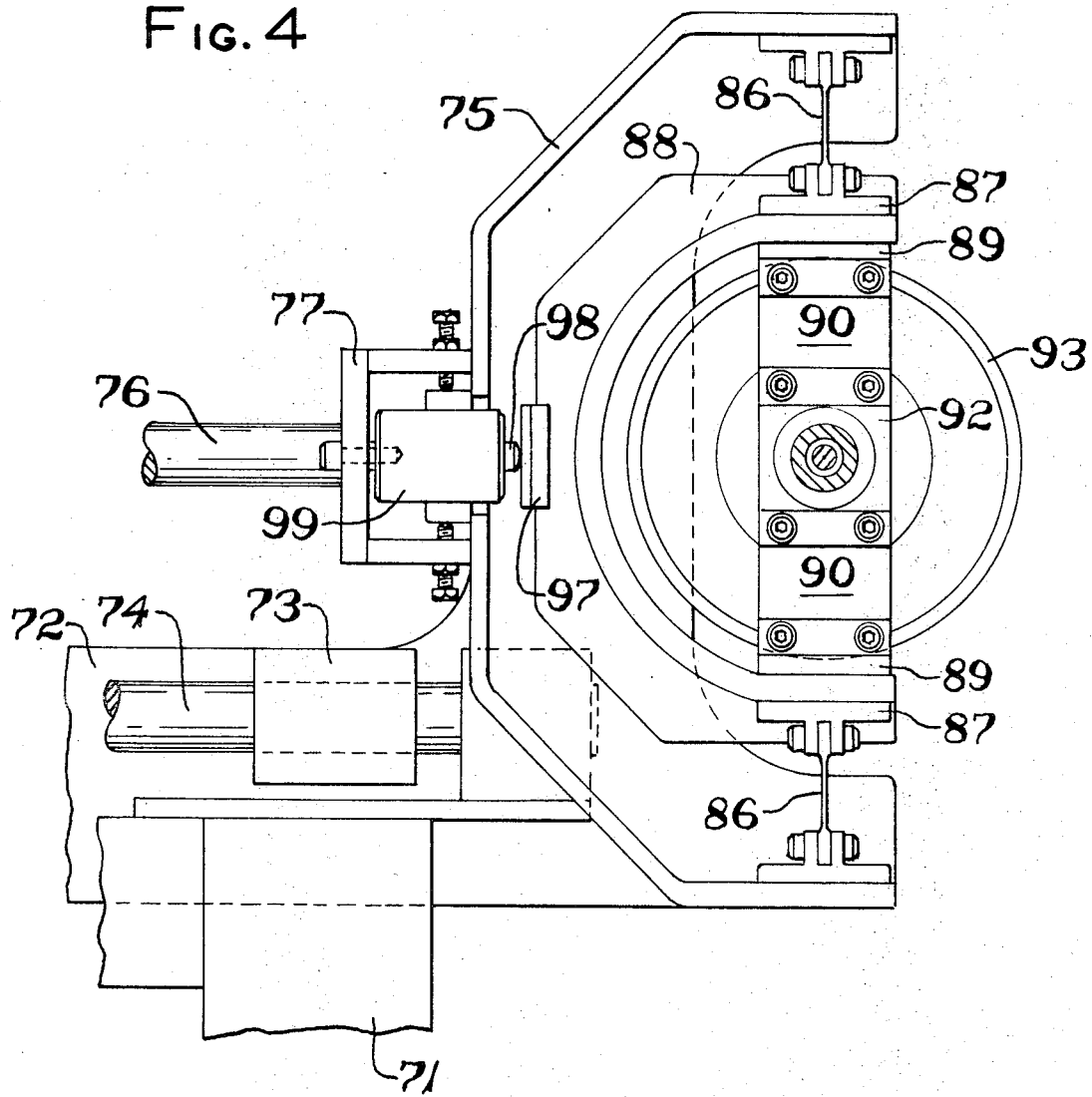

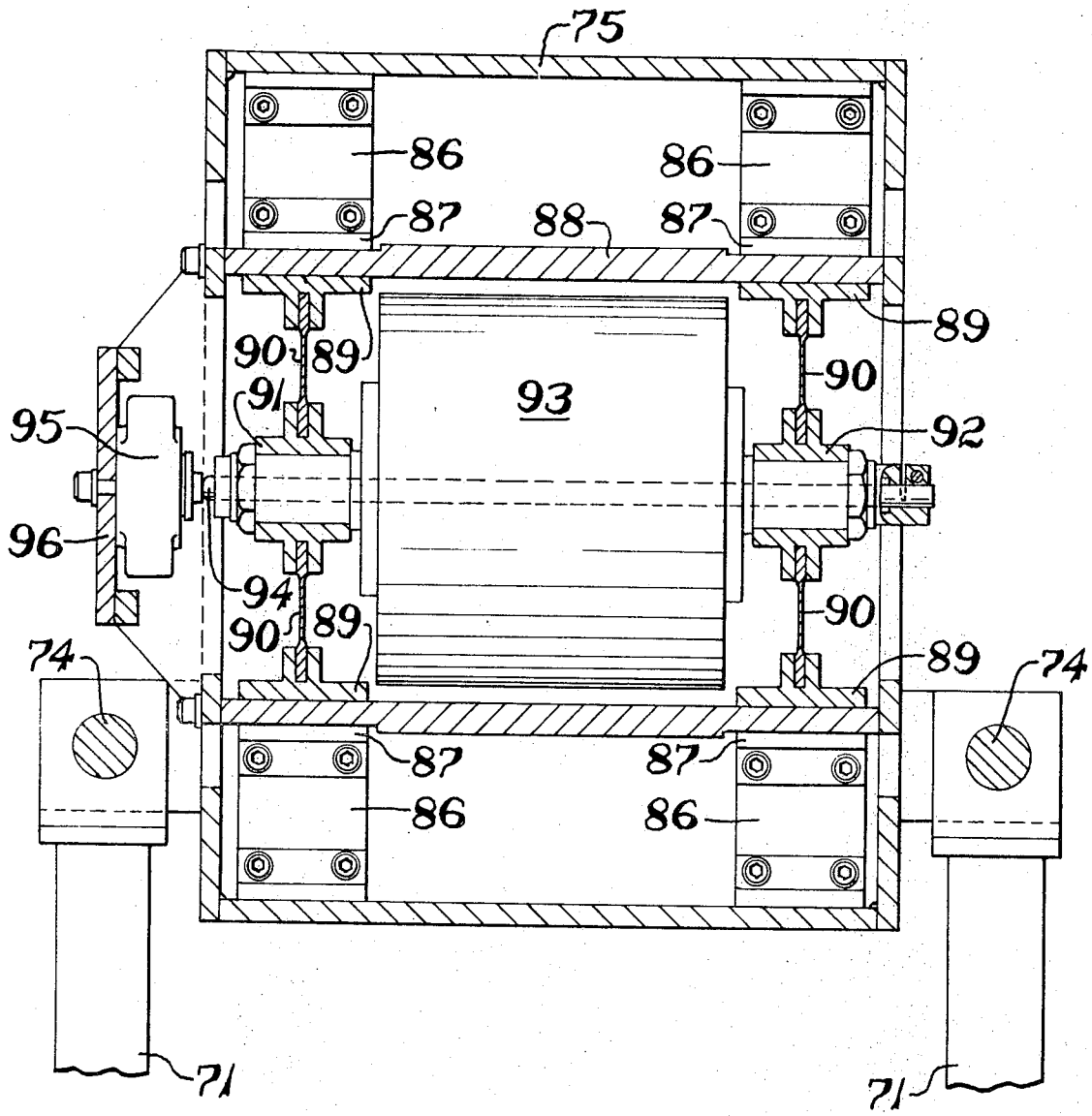

United States Patent Office 3,534,598
Patented Oct. 20, 1970

3,534,598
UNIFORMITY MACHINE
Otto E. Hermanns and Ralph F. Cooper, Akron, and
Harmon G. Shively, Tallmadge, Ohio, assignors to
The B. F. Goodrich Company, New York, N.Y., a
corporation of New York
Filed Feb. 16, 1966, Ser. No. 527,850
Int. Cl. G01m *17/02;* B60c *19/10*
U.S. Cl. 73—146          19 Claims

ABSTRACT OF THE DISCLOSURE

A tire uniformity testing machine having a movable load wheel mounted on a framework which is cooperative with sensing means that positions the load wheel to a preset distance from the axial centerline of the tire. Sensing means record the deviations in tire uniformity construction as the tire is rotated. The method of testing the tire comprises initially testing a tire for non-uniformity and thereafter unloading such tire if found acceptable or if unacceptable, warming up such tire and thereafter testing it for non-uniformity to determine acceptance or rejection.

---

This invention relates to an apparatus and method for measuring tires and more particularly to a novel method and apparatus for measuring the non-uniformity of a tire.

In the construction of a tire carcass, plies of bias cut fabric are cut to length and built up into a cylindrical shape with overlapping edges on a collapsible and/or expansible cylindrical drum. Succeeding plies are wrapped around the drum in a manner such that the cords in adjacent plies are disposed in opposite directions with the ends of the plies overlapping the ends of the drum. The end portions of the plies are turned downward so that a preformed endless bead wire may be positioned thereon such that the end portions of the plies may be turned up and wrapped around the bead wires to enclose them securely. Calendered and extruded strips of rubber which form the overhead, sidewalls and tread are then wrapped around the tire carcass being formed after which such carcass in cooperation with an airbag, or an expansible drum shapes the tire carcass into the customary toroidal cross sectional form for the curing and the final shaping operation. Variations in the type of tire being constructed, type of process used, as well as in type of building machine being used, determine construction. Certain of the operations cause an unevenness in the deposit or accumulation of material onto a tire as in the case of the lap splicing, or as in the turning operation as in enclosing the bead ring. Other problems occur such as the non-uniform centering of the various strips of material, their uneven tensioning, distortion of the rubber or thread when stitching or the gathering of the material when shaping as where flat material is shaped into a cylindrical barrel form with its respective end portions being turned downwardly and thence upwardly into annular shape as well as where the cylindrical barrel form is shaped into a toroidal configuration. Other problems which give rise to non-uniformity in tires is the uneven stitching on a curved surface, lack of material at a splice joint as well as its excess, and non-uniform distribution of splices on a tire carcass.

It is the purpose of the present invention to provide an apparatus which detects these qualities and the magnitude of non-uniformity to determine whether a tire is objectionable or acceptable. In addition, a novel method is utilized to facilitate the measuring of tire uniformity. Tires stored over a period of time often do not respond properly to testing unless they are given a warm-up run, wherein the condition of the tire is normal to its condition of use. However, to conserve time in testing, it facilitates handling to test initially tires without a warm-up and then if necessary after a warm-up.

The present apparatus contemplates the novel coordination of a movable load wheel mounted on a framework which detects radial and axial deflection in cooperation with axially movable flanges which position and inflate a tire. Sensing means cooperate with the positioning of the tire to preset the movable load wheel for a given size. The method of testing a tire comprises initially testing a tire and thereafter unloading such tire as acceptable if the tire so indicates or if unacceptable, warming up such tire and thereafter testing it thereby saving considerable time.

An object of the present invention is to provide a novel apparatus by which an unskilled operator can quickly and efficiently detect and measure tire uniformity.

A further object of this invention is to provide an apparatus which efficiently determines non-uniformity in tires.

Still another object of this invention is to simultaneously measure and correlate the lateral and radial run out of a tire to determine the extent of non-uniformity.

Another object of this invention is to provide a novel method of testing tires for non-uniformity.

A further object is to provide a novel method for testing tires without warm-up and then if necessary with warm-up.

Another object is to provide a novel method which tests tires in their original condition and if unacceptable provides a warm-up period to a second test.

These and other objects will appear more fully in the following description in connection with the accompanying drawings.

FIG. 4 is an enlarged side elevational view of the load wheel and support assembly.

FIG. 5 is an enlarged front elevational cross sectional view of the load wheel and support assembly.

Figure 1:
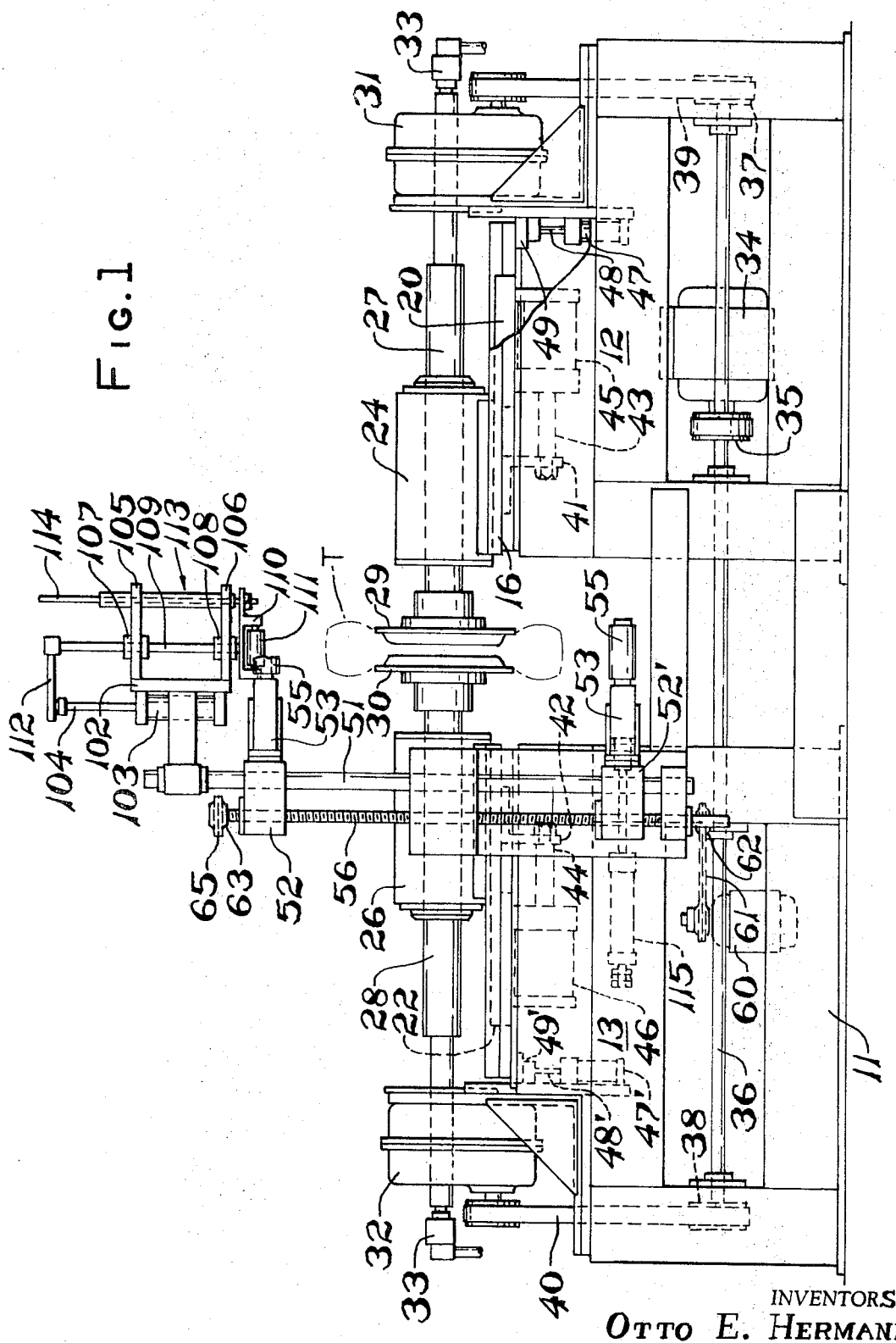
FIG. 1 is a front elevational view of an apparatus in accordance with the invention.

The apparatus shown in FIG. 1 comprises a base 11 that supports a pair of spaced support assemblies designated generally as 12 and 13, which assemblies 12 and 13 include suitable cross braces and channel irons to support the structure to be described. Each support assembly 12 and 13 has longitudinally extending ways 15, 16 and 17, 18 (FIG. 2), respectively, which provide dovetails 19 (FIG. 3) to accommodate a cross slide 20 and 22, respectively. Each cross slide 20 and 22 supports a main spindle assembly 24 and 26 which cross slides move longitudinally toward and away from each other in a manner and for a purpose to be described. Main spindle assemblies 24 and 26 support for rotation and movement therewith hollow spindles 27 and 28 and tire rim flanges 29 and 30, respectively. Mounted on the respective end portion of the support assemblies 12 and 13 are gear reducing units 31 and 32.

Such gear reducing units have a spline connection with the hollow spindles 27 and 28 to provide rotation thereto while permitting longitudinal movement relative thereto. The outermost end portions of the hollow spindles 27 and 28 have rotary unions 33 which are connected to a suitable source of a pneumatic pressure supply which provides pressurized air via hollow spindles 27 and 28 to openings in the rim flanges 29 and 30 whereby a tire T supported between rims 29 and 30 may be inflated. The drive means for the respective gear reducers 31 and 32 are obtained from a main drive motor 34 (FIG. 2) which has its output connected via a belt to a drive pulley 35. Support assemblies 12 and 13 support a longitudinally extending drive shaft 36 which is suitably keyed to the drive pulley 35 and spaced drive pulleys 37 and 38 which via belts 39 and 40 provide an input to the respective gear reducers 31 and 32. Cross slides 20 and 22 have downwardly extending brackets 41 and 42 connected to the end portions of piston rods 43 and 44 of air cylinders 45 and 46. The cylinder end portion of air cylinders 45 and 46 are secured to the respective support assemblies 12 and 13 such that the pressurization of the head end of the air cylinders 45 and 46 move the respective cross slides 20 and 22 and their spindle assemblies 24 and 26 toward each other for engagement with a tire T to be tested on the rim flanges 29 and 30. Pressurization of the rod end and of air cylinders 45 and 46 operates to retract the respective cross slides and respective spindle assemblies to drop a tire held therebetween onto a conveying means to be described.

To lock the cross slides 20 and 22 and their respective spindle assemblies 24 and 26 in their tire retention position (FIG. 1), pneumatic cylinders 47, 47' are secured on support assemblies 12 and 13 with their piston rods 48, 48' secured to vertically reciprocable stop blocks 49, 49' suitably guided on the support assemblies 12 and 13. Pressurization of the head end of pneumatic cylinders 47, 47' moves the respective blocks 49, 49' into the line of movement of cross slides 20 and 22, such that upon pressurization of a tire T held on rim flanges 29 and 30, the lateral pressure on the rim flanges 29 and 30 as well as cross slides 20 and 22 will be in a direction to move cross slides 20 and 22 away from each other until cross slides 20 and 22 engage the stop blocks 49 and 49' which limits their lateral movement. On depressurization of the tire T and the pneumatic cylinders 47 and 47', the cross slides 20 and 22 are free to move axially away from each other to release a tire T held by the rim flanges 29 and 30.

The tire centering means includes a pair of vertically extending guide rods 50 and 51 which are suitably journaled on the support assembly 13. Mounted for vertical reciprocal movement on the guide rods 50 and 51 are a pair of upper bearing blocks 52 and a pair of lower bearing blocks 52' which have laterally extending supports 53 which journal rollers 55. Mounted on support assembly 13 closely adjacent the support rods 50 and 51 are threaded rods 56 and 57 (FIG. 2), which rods at the respective end portions are threadedly engaged by the respective bearing supports 52 and 52'. The respective half threaded portions of the threaded rods 56 and 57 are of opposite hand so that the rotation of the threaded rods 56 and 57 will move the upper and lower bearing blocks 52 and 52' toward and away from each other simultaneously. A motor 60 is mounted on the lower end portion of support assembly 13 with its output connected by a chain 61 to a sprocket 62 which drives threaded rod 56. The upper end portion of threaded rods 56 and 57 have sprockets 63 and 64 (FIG. 2) keyed thereto with a sprocket chain 65 coordinating the rotation of the respective rods.

Mounted rearwardly of the base 11 and support assemblies 12 and 13 is the load wheel sensing means designated generally as 70 which includes a support frame 71 having a suitable dovetail recess thereon to accommodate a carriage 72 for slidable movement toward and away from the support assemblies 12 and 13. Carriage 72 has a plurality of laterally spaced bosses 73 which bosses 73 have bores which slidably engage longitudinally extending guide rods 74 which are mounted on the support frame 71. Carriage 72 has a forwardly disposed C-shaped support frame 75, the rearwardmost end portion of which is connected by a piston rod 76 and bracket 77 to an air cylinder 78. Air cylinder 78 has a rearwardly disposed bracket 79 with a depending pair of bosses 80 which slidably engage the guide rods 74. Bracket 79 has a threaded rod 81 connected thereto extending rearwardly therefrom. Mounted on the rearward-most end portion of support frame 71 is a bracket housing 82 which journals a rotatable nut 85 and supports a motor 83. The output of motor 83 is connected via chain drive 84 to the rotatable nut 85 which threadedly engages the threaded rod 81. Rotation of motor 83 imparts rotation to the nut 85 which in turn moves the air cylinder 78 in a longitudinal direction towards the support assemblies 12 and 13 along with the C-shaped support frame 75 and load wheel support assembly. The upper and lower end portions of C-shaped support frame 75 support a pair of flex plates 86, which flex plates 86 have their one end secured via brackets 87 to a second C-shaped support member 88 which is best seen in FIG. 4. Support member 88 has a pair of brackets 89 on the upper and lower forwardly disposed portion which engages flex plates 90 which in turn support spaced bearings 91 and 92 of cylindrical load wheel 93 (FIG. 5). The one end portion of bearing 91 is operatively connected via a cylindrical rod 94 to a load sensing device 95 suitably secured to a bracket 96 that is connected to the support frame 71 which registers the axial deviation or deflection of the load wheel 93 due to flexing of the flexing plates 90. C-shaped member 88 has a rearwardly disposed plate 97 that is adapted to engage via cylindrical rod 98 load sensing device 99 that is suitably mounted on the C-shaped member 75 to register any radial deflection of the load wheel 93 due to the flexing of flex plates 86. Such load sensing devices as 99 and 95 generate a signal proportional to the amount of deflection of the flex plates, which signal is recorded by a moving needle onto a chart for ease of reading. Load sensing devices are commercially available items and well known in the art, such as those manufactured by the Revere Corporation known as super precision series USP 500 load cells single bridge with compression load adapter.

The tire centering means includes a pair of spaced angle brackets 100 and 101 (FIG. 2) which supports a vertically extending bracket 102. Secured to the rear portion of vertical bracket 102 is a pneumatic cylinder 103 having a vertically extending piston rod 104 for a purpose to be described. Secured to the forwardly extending portion of vertical bracket 102 is an upper bracket 105 and a lower bracket 106. The respective brackets 105 and 106 support bearing houses 107 and 108 which have bores extending therethrough to receive a vertically extending rod 109. A bracket 110 is secured to the lower end portion of rod 109 to rotatably journal a sensing wheel 111. The upper end portion of rod 109 has a laterally extending lifting bar 112 which is adapted to abuttingly engage the piston rod 104. Upon pressurization of the rod end of pneumatic cylinder 103 piston rod 104 moves away from the lifting bar 112 and is retracted within the pneumatic cylinder 103 leaving lifting bar 112 and sensing wheel 111 to move downwardly into engagement with the pneumatic tire T held between rim flanges 29 and 30. Such movement is unrestricted and is determined by the diameter of the tire held by such rims. To measure the extent of movement of the rod 109, a differential transformer 113 having a movable core 114 is secured to the sensing bracket 110 for movement therewith, being slidably guided by the upper and lower brackets 105 and 106. The differential transformer core 114 generates a signal proportional to the movement of such rod 109 which actuates motor 83 to rotate threaded rod 81 to move carriage 72 linearly towards the pneumatic tire T until a bridge circuit measures the extent of movements of such carriage which action generates a further signal which opposes the signal generated by the differential transformer 113 to limit the linear movement of carriage 72. Such control circuits are well known in the art and further description thereof is not deemed necessary. Such movement positions the carriage 72 a preset distance from the pneumatic tire T which for purposes of illustration it will be assumed to be 12 inches. Thus, with the air cylinder 78 having a piston stroke of 13 inches will deflect the pneumatic tire one inch irrespective of size of tire mounted on rim flanges 29 and 30. After the sensing means has measured the size of tire the head end of pneumatic cylinder 103 is pressurized to move piston rod 104 upwardly until bar 112 is engaged and moves such bar upwardly along with the rod 109 and sensing wheel 111 until such sensing wheel 111 is in its uppermost position as shown in FIG. 1 to maintain such sensing means out of engagement with the pneumatic tire for the uniformity testing operation. Pneumatic cylinder 103 remains energized until the next testing operation.

Figure 2:
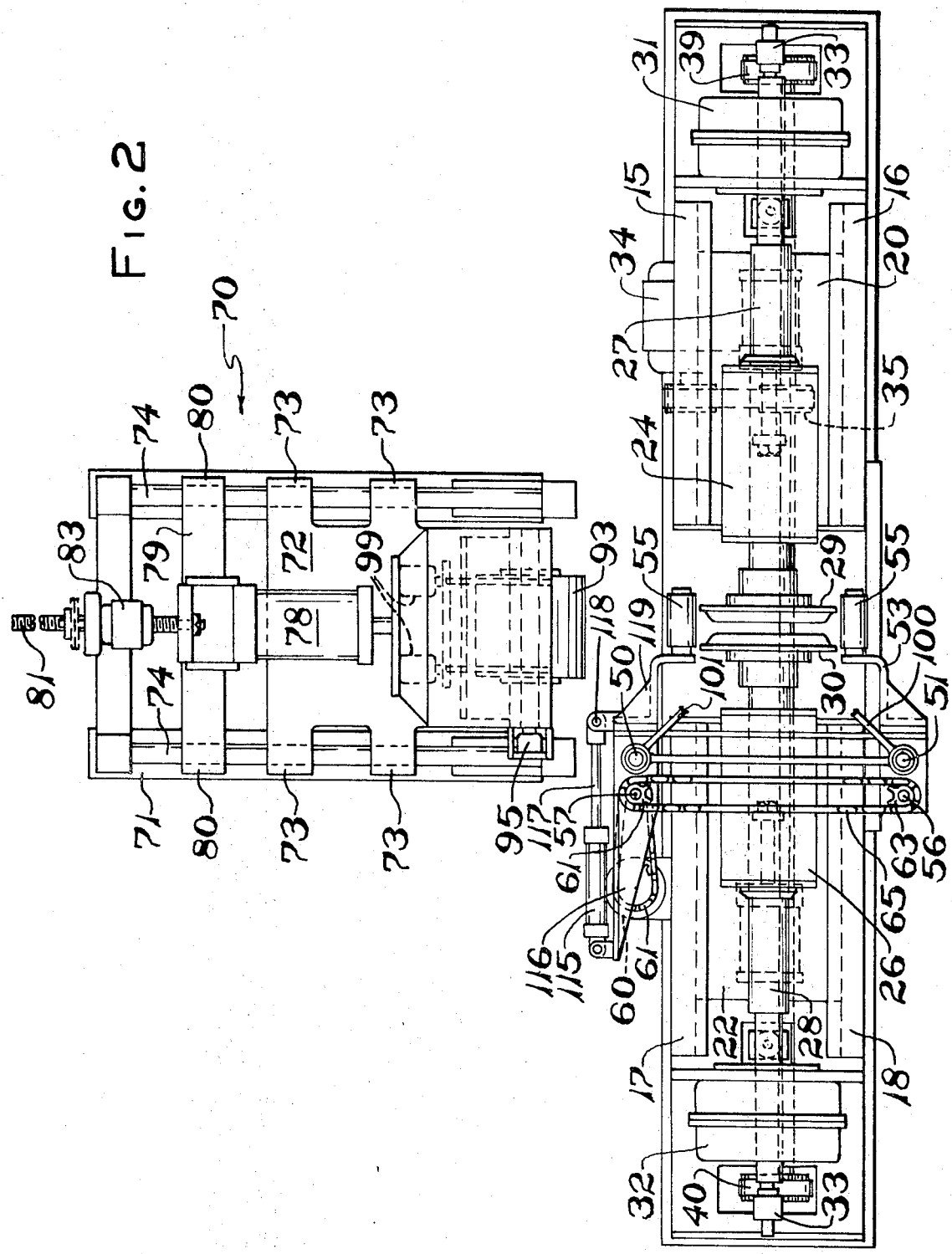
FIG. 2 is a plan view of the apparatus shown in FIG. 1.
Figure 3:
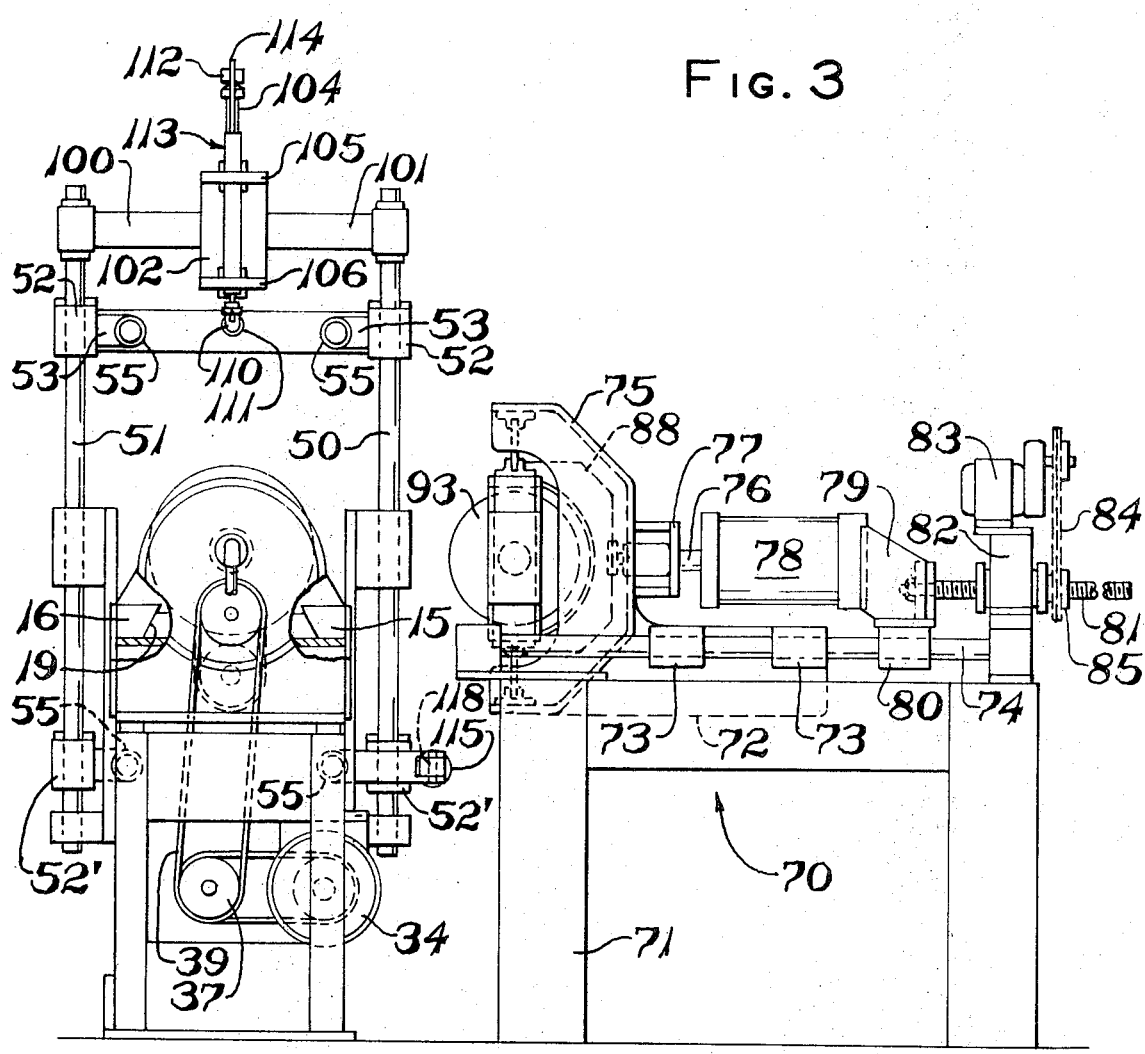
FIG. 3 is an end elevational view taken in the direction of arrow 'X' shown in FIG. 1.

The means for discharging a tire from the tire uniformity machine includes a pneumatic cylinder 115 that is mounted on a bracket 116 that is secured to the rearward portion of support assembly 13 (FIG. 2). Pneumatic cylinder's piston rod 117 has its forward portion pivotally secured as at 118 to a bracket 119 to the lower bearing block 52' such that pressurization of the rod end of pneumatic cylinder 115 pivots bracket 119 in a counterclockwise direction as viewed in FIG. 2 to swing the roller 55 away from the pneumatic tire T to permit such tire to be discharged rearwardly of the support assemblies 12 and 13 underneath the load wheel sensing means 70.

OPERATION

In the operation of the apparatus described, a tire T is placed between the rim flanges 29 and 30. Motor 60 is energized through a suitable switch which rotates threaded rods 56 and 57 through their connection to such motor via chain 61 and sprockets 62 as well as chain 65 (FIG. 2). Rotation of threaded rods 56 and 57 move the respective centering idler rollers 55 toward each other to center the tire T on the tire uniformity machine. During such action the two lower idler rollers 55 raise the tire T until the tire T contacts the two upper idler rollers 55. The rear idler roller 55 may be pivotally mounted so that as the tire contacts such roller 55 it can pivot and operate a suitable limit switch to stop motor 60. Such limit switch may also actuate a valve which supplies pressurized air to the head end of cylinders 45 and 46 to move the main spindle assemblies 24 and 26 along with the rim flanges 29 and 30 toward each other. When such spindle assemblies reach the end of their stroke, a suitable limit switch is closed which pressurizes the head end of cylinders 47 and 47' which action moves the respective stop blocks 49 and 49' upwardly for engagement by the cross slides 20 and 22. With the stop blocks 49 and 49' suitable limit switches are operated to actuate motor 60 to retract the idler rollers 55 to their maximum open positions at which time motor 60 is deactuated, along with actuation of cylinder 115 which pivots bracket 119 and its associated idler roller 55 counterclockwise as viewed in FIG. 2 to facilitate the later removal of a tire from the machine. Simultaneously with such action pressurized air is supplied through rotary unions 33 and via hollow spindles 27 and 28 and orifices in the rim flanges 29 and 30 to inflate a tire T held between such flanges.

Since the resultant force in the pneumatic tire T is greater than that on the pistons in cylinders 45 and 46, cross slides 20 and 22 will be forced rearwardly or laterally away from each other as viewed in FIG. 1 until such cross slides engage their respective stop blocks 49 and 49' which securely retain the cross slides and the rim flanges 29 and 30 in locked position to prevent the tire T from being dislodged from its testing position. The tire sensing means is then actuated such that the rod end of pneumatic cylinder 103 is energized moving piston rod 104 downwardly out of egagement with the lifting bar 112. The sensing wheel 111 comes into engagement with the pneumatic tire T thereby sending a signal through the differential transformer 113 to energize the motor 83 which thereby positions carriage 72 twelve inches away from the edge of the pneumatic tire T. Sensing wheel 111 is then withdrawn by the pressurization of the head end of pneumatic cylinder 103 thereby conditioning the tire uniformity apparatus for a testing operation. The head end of air cylinder 78 is then pressurized which moves the carriage 72 along with load sensing wheel 93 forwardly until the edge of the pneumatic tire T is depressed one inch. Motor 34 is then energized and supplies power rotation to the drive shaft 36 which in turn rotates via drive pulleys 37, 38 and through the respective gear reducers 31 and 32 to rotate the main drive spindles 27 and 28 in a clockwise direction for two rotations after which motor 34 is reversed in its direction of rotation to rotate the hollow drive spindles 27 and 28 in a reverse direction for two rotations. Suitable photo units count two revolutions forward and then provide for a reverse rotation via suitable circuit controls. During rotation of the tire T the flex plates 86 and 90 through their respective load cells 95 and 99 detect any unusual variation in tire construction as discussed above and indicate and record such deviation onto a suitable chart in a manner chart in a manner well known in the art. Upon completion of the testing operation the air is exhausted from the tire T thereby permitting the pressure in the cylinders 45 and 46 to move the rim flanges 29 and 30 inwardly toward each other. The stop blocks 49 and 49' are then retracted upon pressuzation of the rod end of cylinders 47 and 47' thereby permitting the retraction of the respective rim flanges 29 and 30 upon pressurization of the rod end of cylinders 45 and 46 which action discharges the tire T underneath the load sensing apparatus 70 in a manner described above through the actuation of pneumatic cylinder 115. As the rim flanges 29 and 30 move apart the trapped air loosens the tire from the flanges and facilitates the tire dropping down onto the centering roller 55 for movement out from the machine.

The method for measuring the non-uniformity in tires comprises initially loading the tires into the testing machine without any warming up of the tire, thence selectively unloading those tires which are acceptable and warming up those tires which did not measure up to the required standard. Thereafter, subject such latter tires to a warming up as by running such tires while still mounted in the testing apparatus for a specified time and thence test such tire for uniformity of quality. Such warming up may be done on a separate or second test machine; however, to conserve time the testing may be carried out on the same test machine.

We claim:

1. An apparatus for measuring tire uniformity comprising support means having laterally spaced rim flanges movably axially toward and away from each other for rotatably supporting an inflatable tire therebetween; means for rotating said rim flanges and a tire supported therebetween; a load wheel support movable rectilinearly toward and away from said rim flanges; said load wheel support having a load wheel means rotatably mounted thereon, flex plates interconnecting said load wheel support and said load wheel means; means for moving and holding said load wheel support and load wheel means a preselected distance from the coaxial center line of said flanges to depress a tire held by said flanges a preselected amount; and load measuring means mounted on said load wheel support operatively connected to said load wheel means for registering radial and axial forces due to irregularities in the tire construction.

2. An apparatus as set forth in claim 1 wherein said means for rotating said rim flanges includes means for rotating said flanges at a slow speed and at a relatively high speed for warm-up of a tire held by said flanges.

3. An apparatus as set forth in claim 2 wherein sensing means cooperates with a tire located on said flanges measures the diameter of such tire and provides preselected movement to said load wheel means toward and away from said flanges.

4. An apparatus as set forth in claim 3 wherein said rim flanges are mounted on separate cross slides movable toward and away from each other, and stop blocks movably mounted on said support means for movement into the line of movement of said cross slides to limit axial movement away from each other to lock said cross slides in position for holding a tire to be tested.

5. An apparatus for measuring tire uniformity comprising support means for rotatably supporting a tire about a fixed axis, means in said support means for inflating said tire to a preselected pressure, a load wheel assembly having a carriage and a load wheel, means operatively connected to said carriage for moving said carriage rectilinearly toward said axis a preset distance into engagement with a tire on said support means to depress the peripheral circumference at the point of contact a predetermined amount, and said load wheel assembly having means operatively connected thereto for detecting and registering radial and lateral forces onto a chart from the engagement of said load wheel with such tire wherein said carriage has a first support member, said first support member interconnected with flex plates to a second support member, a first load cell mounted on said first support member operatively connected to said second support member to detect movement in a direction radially to said axis, said second support member interconnected with flex plates to said load wheel, a second load cell mounted on said first support member operatively connected to said load wheel to detect movement in a direction parallel to said axis, and recording means operatively connected to said load cells to register the forces thereon.

6. An apparatus as set forth in claim 5 wherein sensing means is mounted on said support means for movement toward and away from said axis to measure the diameter of a tire located on said support means to condition said carriage for preselected movement toward said axis.

7. An apparatus as set forth in claim 6 wherein said means for rotating said rim flanges includes means for selectively rotating said flanges at a slow test speed or a high warm-up speed.

8. A machine for testing tire uniformity comprising, a support frame, said support frame having a pair of spaced flanges for supporting a tire mounted thereon, means operatively connected to said flanges for moving said flanges laterally toward and away from each other, means for rotating said flanges as a unit, means for introducing air at a controlled pressure between said flanges to inflate a tire held between said flanges, a load wheel assembly movable toward and away from said flanges for into and out of engagement with a tire held by said flanges, said load wheel assembly having a first and second drive means for moving said assembly toward and away from said flanges, measuring means operatively connected to said support frame operatively upon energization to move toward said flanges to measure the diameter of tire held therebetween, said measuring means operative upon energization to actuate said first drive means to move said load wheel assembly a predetermined amount in response to the amount of movement of said measuring means toward said flanges, said second drive means operative after actuation of said first drive means for moving said load wheel assembly toward said flanges a preselected amount to depress the tread of a tire held between said flanges a preselected amount, and load sensing means on said load wheel assembly for measuring radial and lateral forces on such loaded tire.

9. A machine as set forth in claim 8 wherein a pair of spaced cross slides are mounted on said support frame movable toward and away from each other, each of said cross slides supports one of said pair of flanges, said means for moving said flanges laterally being pneumatic cylinders operatively connected to said cross slides for moving said cross slides and their associated flanges toward and away from each other, a pair of pneumatic cylinders operatively connected to stop blocks for moving said stop blocks into and out of engagement with said cross slides to limit movement of said cross slides away from each other to hold a tire between said flanges, and means for introducing pressurized air to said pneumatic cylinders at a pressure less than said controlled pressure to said flanges for inflating a tire held between said flanges.

10. A machine as set forth in claim 9 wherein said load wheel assembly is mounted on a carriage for movement on guideways toward and away from said flanges, said first drive means mounted on a support, said second drive means having connecting means spacing said second drive means from said support, said first drive means being operative upon said actuation to selectively move said connecting means and said spacing between said second drive means and said support, and said second drive means operatively connected to said carriage operative upon actuation to move said carriage and said load wheel assembly a predetermined amount to depress the tread of a tire held between said flanges a preselected amount.

11. A machine as set forth in claim 10 wherein said carriage has a first support member, said first support member interconnected with flex plates to a second support member, a first load cell mounted on said first support member operatively connected to said second support member to detect movement in a direction radially to said axis, said second support member interconnected with flex plates to a load wheel, a second load cell mounted on said first support member operatively connected to said load wheel to detect movement in a direction parallel to said axis, and recording means operatively connected to said load cells to register the forces thereon.

12. An apparatus for measuring tire uniformity comprising support means with spaced flanges for rotatably supporting a tire about a fixed axis, means for inflating the cavity defined by said spaced flanges and a tire mounted thereon, a support frame mounted rearwardly of said support means for movably supporting a carriage slidably toward and away from said fixed axis, said carriage supporting a load wheel assembly, said load wheel assembly having a load wheel movable into engagement with such tire held by said flanges, load measuring means operatively connected to said load wheel for registering radial and lateral forces due to irregularities in the tire construction, first drive means mounted on said support frame for selectively moving said carriage a predetermined amount toward and away from said axis upon actuation and deactuation thereof, said drive means and said carriage movably supported on said support frame as a unit, and locater means mounted on said support frame operatively connected to said drive means for moving said drive means and said carriage relative to said axis.

13. An apparatus as set forth in claim 12 wherein sensing means is operative to measure the diameter of such tire and provide a signal in response to such measurement to energize said locater means to move said drive means proportional to said signal.

14. An apparatus as set forth in claim 12 wherein sensing means is mounted on said support means, means operatively connected to said sensing means for actuating said sensing means to measure a tire held between said spaced flanges to provide a signal proportional to said measurement, said locater means comprising a second drive means operatively connected to rotate a drive shaft, said drive shaft being connected to said first drive means for moving said first drive means and said load wheel assembly in proportion to the signal received from said sensing means.

15. An apparatus for measuring tire uniformity comprising a frame support having laterally spaced rim flanges movable axially toward and away from each other for supporting an inflatable tire therebetween, said apparatus having means for rotating said rim flanges and a tire supported therebetween about a central axis, a support means movable toward and away from said rim flanges, said support means having a first C-shaped frame member supporting an upper and lower flex plates, said flex plates being connected to a second C-shaped frame member having a pair of spaced bearing supports, said bearing supports supporting for rotation a load wheel, means on said apparatus operatively connected to said support means for moving said load wheel a predetermined distance from said central axis to exert a predetermined load on a tire mounted between said flanges, and load measuring means operatively connected to said load wheel means for providing an electrical signal in response to variations in radial forces due to irregularities in the tire construction.

16. An apparatus as set forth in claim 15 wherein sensing means cooperates with a tire located on said flanges measures the diameter of such tire and provides preselected movement to said load wheel means for moving said load wheel a predetermined distance toward and away from said flanges.

17. An apparatus for measuring tire uniformity comprising support means having laterally spaced rim flanges movable axially toward and away from each other for rotatably supporting an inflatable tire therebetween; means for rotating said rim flanges and a tire supported therebetween; a load wheel means movable toward and away from said rim flanges, means for moving said load wheel means a preselected amount toward said flanges to depress a tire held by said flanges a preselected amount; said load wheel means includes a first C-shaped frame member supporting an upper and lower flex plate, said flex plates being connected to a second C-shaped frame member movable radially relative to the axis of said rim flanges, said second C-shaped frame member supporting a pair of spaced flex plates which support a load wheel, a load cell operatively connected to said load wheel to detect and measure lateral forces on said load wheel through flexure of said spaced flex plates; and a load cell operatively connected to said second C-shaped frame member to detect and measure radial forces on said load wheel through flexure of said upper and lower flex plates.

18. An apparatus for measuring tire uniformity comprising support means having rim flanges for rotatably supporting an inflatable tire; means for rotating said rim flanges and a tire supported therebetween about a central axis; load wheel means movable toward and away from said rim flanges for exerting a force on a tire mounted between said flanges, means operatively connected to said load wheel means for moving said load wheel means a predetermined distance from said central axis; means operatively connected to said load wheel means for measuring radial forces as said flanges and tire mounted thereon are rotated due to irregularities in the tire construction, said load responsive means includes a first C-shaped frame member supporting an upper and lower flex plate, said flex plates being connected to a second C-shaped frame member movable radially relative to the axis of said rim flanges, said second C-shaped frame member supporting for rotation said load wheel, and a load cell operatively connected to said second C-shaped frame member to detect and measure radial forces on said load wheel through flexure of said upper and lower plates.

19. An apparatus for measuring tire uniformity comprising support means having laterally spaced rim flanges movable axially toward and away from each other for rotatably supporting an inflatable tire therebetween; means connected to said rim flanges for rotating said rim flanges and a tire supported therebetween about a central axis; load wheel means mounted on a support frame; motive means operatively connected to said load wheel means for moving said load wheel means toward and away from said rim flanges for exerting a force on a tire supported between said flanges; sensing means mounted adjacent said rim flanges for measuring diameters of tires held by said flanges; said sensing means being operative upon such measurement of tires to provide a signal and actuate said motive means; said motive means operatively connected to said load wheel means and responsive to actuation by said sensing means for moving said load wheel means rectilinearly toward said central axis and position said load wheel a predetermined distance from said central axis in accordance with said signal to impose a load on such tire supported between said flanges; and load responsive means operatively connected to said load wheel for measuring radial forces due to irregularities in the tire construction.

References Cited

UNITED STATES PATENTS

| | | | |
|---|---|---|---|
| 3,375,714 | 4/1968 | Bottasso | 73—146 |
| 2,251,803 | 8/1941 | Pummill | 33—203.13 XR |
| 2,695,520 | 11/1954 | Karsai | 73—146 |
| 3,208,154 | 9/1965 | Pancoast | 33—203.13 |

OTHER REFERENCES

Bajer, "The Control of Tire Non-Uniformity and A Passenger Car Manufacturer's Point of View," Society of Automotive Engineers, pp. 1–15, 1963.

DONALD O. WOODIEL, Primary Examiner